(12) United States Patent
Grafenburg et al.

(10) Patent No.: US 12,174,384 B2
(45) Date of Patent: Dec. 24, 2024

(54) OPTICAL SYSTEM FOR A VIRTUAL RETINAL DISPLAY

(71) Applicant: Robert Bosch GmbH, Stuttgart (DE)

(72) Inventors: Christian Adam Grafenburg, Stuttgart (DE); Carsten Reichert, Waldenbuch (DE); Reinhold Fiess, Durbach (DE)

(73) Assignee: ROBERT BOSCH GMBH, Stuttgart (DE)

(*) Notice: Subject to any disclaimer, the term of this patent is extended or adjusted under 35 U.S.C. 154(b) by 46 days.

(21) Appl. No.: 18/315,582

(22) Filed: May 11, 2023

(65) Prior Publication Data

US 2023/0408810 A1 Dec. 21, 2023

(30) Foreign Application Priority Data

Jun. 13, 2022 (DE) ............ 10 2022 205 969.7

(51) Int. Cl.
| | |
|---|---|
| *G02B 27/01* | (2006.01) |
| *G02B 26/08* | (2006.01) |
| *G02B 26/10* | (2006.01) |
| *G02B 27/00* | (2006.01) |
| *G06F 3/01* | (2006.01) |

(Continued)

(52) U.S. Cl.
CPC ..... *G02B 27/0172* (2013.01); *G02B 26/0833* (2013.01); *G02B 26/105* (2013.01); *G02B 27/0093* (2013.01); *G06F 3/013* (2013.01); *G06T 5/80* (2024.01); *G02B 2027/0174* (2013.01); *G02B 2027/0178* (2013.01); *G02B 2027/0187* (2013.01); *G09G 3/025* (2013.01); *G09G 2354/00* (2013.01)

(58) Field of Classification Search
CPC ............ G02B 27/0093; G02B 27/017; G02B 27/0172; G02B 2027/0178; G02B 2027/0187; G02B 26/0833; G02B 26/105; G06F 3/013; G06T 5/80; G09G 3/025; G09G 2354/00
See application file for complete search history.

(56) References Cited

U.S. PATENT DOCUMENTS

| | | | | |
|---|---|---|---|---|
| 7,619,801 | B1* | 11/2009 | Shih ................ | G02B 26/105 359/662 |
| 11,960,075 | B1* | 4/2024 | Milanovic ......... | G02B 26/0833 |

(Continued)

FOREIGN PATENT DOCUMENTS

| | | |
|---|---|---|
| WO | 2012062681 A1 | 5/2012 |
| WO | 2017008971 A1 | 1/2017 |

*Primary Examiner* — Darlene M Ritchie
(74) *Attorney, Agent, or Firm* — NORTON ROSE FULBRIGHT US LLP; Gerard A. Messina

(57) ABSTRACT

An optical system for a virtual retinal display. The system includes: an image source; an image processing device; a projector unit including a light source generating a light beam and a controllable deflection device for the light beam for scanning projection of the image content; a first redirection unit comprising a first mirror and a statically mounted optical unit, the controllable deflection device projecting the image content onto the first mirror, and the first mirror directs the projected image content onto the statically mounted optical unit; a second redirection unit, the optical unit projecting image content onto the second redirection unit, the second redirection unit directing the projected image content onto an eye of a user.

16 Claims, 3 Drawing Sheets

(51) Int. Cl.
    *G06T 5/80*     (2024.01)
    *G09G 3/02*     (2006.01)

(56) References Cited

U.S. PATENT DOCUMENTS

| | | | |
|---|---|---|---|
| 2016/0202478 A1* | 7/2016 | Masson | G02B 27/0101 |
| | | | 353/30 |
| 2016/0349516 A1* | 12/2016 | Alexander | G02B 5/32 |
| 2017/0293147 A1* | 10/2017 | Tremblay | G02B 5/189 |
| 2020/0285055 A1 | 9/2020 | Shirko | |
| 2022/0299758 A1* | 9/2022 | Adema | G02B 26/101 |

\* cited by examiner

OPTICAL SYSTEM FOR A VIRTUAL RETINAL DISPLAY

CROSS REFERENCE

The present application claims the benefit under 35 U.S.C. § 119 of German Patent Application No. DE 10 2022 205 969.7 filed on Jun. 13, 2022, which is expressly incorporated herein by reference in its entirety.

FIELD

The present invention relates to an optical system for a virtual retinal display.

BACKGROUND INFORMATION

Data glasses (smartglasses) with retinal scan displays are already available.

SUMMARY

The present invention provides an optical system for a virtual retinal display (retinal scan display). According to an example embodiment of the present invention, the system includes:
a. an image source, which provides image content in the form of image data;
b. an image processing device for the image data;
c. a projector unit with a light source, which can in particular be time-modulated, for generating at least one light beam and with a controllable deflection device for the at least one light beam for scanning projection of the image content;
d. a first redirection unit comprising a first mirror and at least one statically, in particular fixedly, mounted optical unit, wherein the controllable deflection device is designed to project the image content onto the first mirror, wherein the first mirror is designed to direct the projected image content onto the statically mounted optical unit;
e. a second redirection unit, wherein the statically mounted optical unit is designed to direct the projected image content onto the second redirection unit, wherein the second redirection unit is configured to direct the projected image content onto an eye of a user of the virtual retinal display.

The first mirror is designed as a mirror that is at least one-dimensionally rotatably mounted, so that the light beam impinges via a first imaging path on at least a first projection region of the second redirection unit at a first angle of incidence when the first mirror is in a first mirror position, and the light beam impinges via a second imaging path on at least a second projection region of the second redirection unit at a second angle of incidence when the first mirror is in a second mirror position. In particular, the respective projection regions form a respective surface within which a light beam is deflected/redirected in the direction of the user eye, in particular in the direction of an eye pupil surface of the optical system, when said light beam impinges on the second redirection unit. The statically mounted optical unit is designed to direct the projected image content onto the second redirection unit in such a way that the first and second projection regions of the second redirection unit at least partially overlap.

This configuration according to an example embodiment of the present invention of the optical system achieves high efficiency of the optical system since the light beam or the beam bundle is not divided but only redirected and the substantially full laser power can thus be used for each imaging path. There is no loss of image information in the total eyebox. In addition, by redirecting the light beam or the beam bundle depending on the respective mirror position of the first mirror, a spatial resolution and/or a field of view of the original image content is at least substantially retained across the different imaging paths. In addition, the optical system requires comparatively little space and the optical system has no noticeable vibrations.

The term "virtual retinal display" is in particular understood to mean a retinal scan display or a light field display, in which the image content is sequentially scanned by deflection of at least one light beam, in particular a laser beam of at least one light source, in particular a time-modulated light source, such as one or more laser diodes, and is imaged by optical elements directly onto the retina of the user eye. The image source is in particular designed as an electronic image source, for example a graphics output, in particular an (integrated) graphics card, a computer or processor, or the like. The image source may, for example, be integrally formed with the image processing device of the optical system. Alternatively, the image source may be formed separately from the image processing device and transmit image data to the image processing device of the optical system. The image data are in particular formed as color image data, e.g., RGB image data. In particular, the image data may be designed as still or moving images, e.g., videos. The image processing device is preferably provided to modify, in particular to distort, misrepresent, copy, rotate, shift, scale, or the like, the image data of the image source. The image processing device is preferably provided to generate copies of the image content, which are in particular modified, for example distorted, rotated, shifted and/or scaled.

According to an example embodiment of the present invention, the projector unit is in particular configured to emit the image content from the image data in the form of scanned and/or rasterized light beams. In particular, the projector unit comprises a deflection device, preferably a MEMS mirror (micromirror actuator), at least for controlled deflection of at least one light beam of the light source of the projector unit. Alternatively or additionally, the deflection device comprises at least one switchable diffractive optical element in the form of a phase modulator and/or intensity modulator, which can, for example, be designed as a spatial light modulator (SLM) in a reflective design, e.g., in a DMD or LCoS design, or in a transmissive design, e.g., as an LCD. In particular, the time-modulatable light source is modulated analogously, wherein an alternative TTL modulation is however also not ruled out, for example. The second redirection unit in particular comprises an arrangement of optical elements, for example diffractive, reflective, refractive, and/or holographic optical elements. However, the second redirection unit preferably always comprises at least one holographic optical element. The second redirection unit is at least partially integrated into an eyeglass lens of a pair of data glasses. The second redirection unit is in particular provided to redirect only a part of the intensity of the projected image content onto the user eye. At least a further part of the intensity of the projected image content passes through the second redirection unit. The second redirection unit appears substantially transparent to a user, at least when viewed from a perpendicular viewing direction.

Preferably, according to an example embodiment of the present invention, the first mirror is designed as a two-dimensionally rotatably mounted mirror, in particular micromirror. The image content in the form of the at least one light beam can thus be projected two-dimensionally onto the first mirror.

Preferably, according to an example embodiment of the present invention, the second redirection unit is designed to direct the light beam in the direction of a first exit pupil (A) of the user when said light beam impinges on the first projection region at a first angle of incident and to direct the light beam in the direction of a second exit pupil (B) of the user when said light beam impinges on the second projection region at a second angle of incident. The first exit pupil (A) and the second exit pupil (B) are in particular arranged offset from one another. The effective total eyebox of the user is thus enlarged.

Preferably, according to an example embodiment of the present invention, the optical system additionally comprises an optical replication component, which is arranged at least in the first and second projection regions of the second redirection unit and is configured to direct the projected image content, replicated and spatially offset, onto the eye of the user so that a plurality of spatially offset exit pupils (A, A', B, B') with the image content is generated. A particularly large, effective total eyebox of the user can thus be achieved.

Preferably, according to an example embodiment of the present invention, the optical replication component is realized in a layered structure with at least one holographically functionalized layer. As a result, a simple and/or effective optical replication can advantageously be achieved.

Advantageously, a particularly high number of exit pupils and thus a particularly large, effective total eyebox can thereby be achieved. In particular, an (unreplicated) exit pupil set (eyebox set) is generated from a first holographically functionalized layer of the optical replication component. In particular, a replication of the entire exit pupil set is generated from each further holographically functionalized layer in addition to the first holographically functionalized layer of the optical replication component. In particular, with every replication of an exit pupil set, a spatially and/or angularly displaced copy of the original image regions, in particular of the (unreplicated) exit pupil set, is generated. In particular, it is possible that the optical replication component has at least three or more holographically functionalized layers.

In particular, according to an example embodiment of the present invention, the holographically functionalized layers are each partially reflective and partially transparent. In particular, the optical replication is generated in that the same image information, in particular the same light beam of two holographically functionalized layers of the optical replication component, is in each case differently deflected two times, e.g., in two different angular directions, and thus crosses the eye pupil surface at two different points. In particular, the optical replication component can be used to replicate, preferably duplicate, a pattern or an arrangement of exit pupils in the eye pupil surface in the vertical direction and/or in the horizontal direction and/or in directions oblique to the vertical direction/horizontal direction.

If the holographically functionalized layers of the optical replication component are designed as reflective (e.g., reflection holograms) and/or transmissive (e.g., transmission holograms) holographic optical elements (HOEs), a particularly advantageous replication can be achieved. In particular, different HOEs can have different optical functions, which in particular generate a different deflection of impinging light beams (e.g., by forming reflection holograms that reflect light beams like concave mirrors or convex mirrors). In particular, each HOE is formed from a holographic material, for example from a photopolymer or from a silver halide. In particular, for each HOE, at least one holographic optical function is inscribed in the holographic material. In particular, for each HOE, at least one holographic optical function comprising several wavelengths is inscribed in the holographic material. In particular, for each HOE, at least one holographic optical function comprising RGB wavelengths is inscribed in the holographic material.

In addition, according to an example embodiment of the present invention, it is provided that the optical replication component be realized in a layered structure with at least two layers that are arranged one above the other and have different holographic functions, whereby the plurality of spatially offset exit pupils is generated. As a result, an advantageous replication of images can be achieved, which is in particular inexpensive and/or simple to produce. In particular, the layers with different holographic functions are arranged layer by layer one behind the other in a direction at least substantially perpendicular to the eye pupil surface, preferably in an intended viewing direction toward the optical replication component. In particular, the optical replication component is integrated into at least one eyeglass lens of the data glasses. It is possible that the optical replication component extends only across a part of the eyeglass lens or across the entire eyeglass lens. In particular, the optical replication component has sufficiently high transparency so that it appears transparent to a wearer of the data glasses. The holographically functionalized layers can be of different sizes, but the holographic material layers preferably overlap completely or almost completely from the intended viewing direction toward the optical replication component. The holographically functionalized layers may adjoin one another directly or be separated from one another by a (transparent) intermediate layer. It is possible that the holographic functions of the various holographically functionalized layers are designed for a deflection of various wavelengths (e.g., a holographic layer per influenced wavelength), but the holographic functions of the various holographically functionalized layers are preferably designed for a deflection of the same RGB wavelengths.

If the optical replication component alternatively comprises at least one layer in which at least two different holographic functions are realized, wherein the different holographic functions are formed in a common plane but in different intermittent zones of the layer, and whereby the plurality of spatially offset exit pupils is generated, a particularly thin configuration of the optical replication component can advantageously be achieved. Advantageously, a number of holographic functions per holographic material layer can thereby be increased. Preferably, a spatial extent of HOE substructures of the intermittent zones of the layer of the optical replication component is substantially smaller than a diameter of the light beam, in particular laser beam, of the projector unit. In this context, the term "substantially smaller" is understood to mean at most half as large, preferably at most one third as large, preferably at most one quarter as large, and particularly preferably at most one tenth as large. This advantageously ensures that each image information item arrives in both exit pupils generated by the different holographic functions. It is possible that layers having different intermittent zones are combined with wholly holographically functionalized layers.

According to an example embodiment of the present invention, preferably, the image processing device is designed to provide different sub-image data for the respective imaging path so that distortion of the image content across the respective imaging path is at least partially compensated. The image processing device is preferably provided to generate copies of the image content, which are in particular modified, for example distorted, rotated, shifted and/or scaled. Sub-image data thus mean all image data changed or modified in comparison to the original image data. Preferably, the image processing device is configured to take into account the detected eye state of the user when generating the image data, in particular the sub-image data, and/or to take into account which imaging path is currently being used in order to compensate for brightness fluctuations caused thereby in the image impression. As a result, a brightness impression as constant as possible can advantageously be generated.

Preferably, according to an example embodiment of the present invention, the first mirror is rotatably mounted in such a way that the different positions, in particular the first and second mirror positions, of the first mirror are continuously adjustable. A continuous, dynamic change or adjustment of the imaging paths is thus made possible. Alternatively, the first mirror is rotatably mounted in such a way that the first mirror has a number of 2 to 1024 different mirror positions in one dimension, in particular in a first or second dimension. In particular, the first mirror has a number of 5 to 60 different mirror positions in one dimension. The plurality of exit pupils (A, B) resulting therefrom are in particular arranged in a raster. The term "raster" is to be understood in particular to mean a regular pattern distributed on a surface. This plurality of exit pupils are in particular arranged at a sufficiently small distance from one another so that even with a minimum pupil diameter, it is ensured that light from at least one exit pupil can be transmitted through the pupil of the user eye.

Preferably, according to an example embodiment of the present invention, the optical unit is designed to focus, in particular bundle, a plurality of, in particular scanned, light beams onto the respective projection region. The light beams of a complete scan region or the light beams of a complete image content are thus merged by means of the optical unit in the direction of the respective projection region.

According to an example embodiment of the present invention, preferably, the optical unit is designed as at least one concave mirror. Alternatively, the optical unit is designed as a holographic optical element. Furthermore alternatively, the optical unit is designed as a collecting lens. Furthermore alternatively, the optical unit is designed as a spatial light modulator (SLM). Furthermore alternatively, the optical unit is designed as a convex mirror.

Preferably, according to an example embodiment of the present invention, the optical unit of the first redirection unit at least partially extends into a beam path between the controllable deflection device of the projector unit and the first mirror of the first redirection unit. Accordingly, the optical unit crosses the at least one light beam coming from the deflection device at least partially. In order to furthermore enable the scanning light beam to reach the first mirror, in particular unimpededly, the optical unit is designed to be at least partially transparent to the at least one light beam in the direction of the controllable deflection device. This arrangement saves space and creates freedom of design for the optical system.

Preferably, according to an example embodiment of the present invention, the first mirror is designed as a planar mirror. Alternatively, the first mirror is designed as a curved mirror. In this context, the curved mirror is in particular designed as a concave mirror or as a convex mirror. Alternatively, the first mirror is designed as a first holographic optical element. Furthermore alternatively, the first mirror is designed as a totally reflective surface in an optically dense medium, for example a liquid prism.

Preferably, according to an example embodiment of the present invention, the optical system additionally comprises a collimating element for collimating a plurality of, in particular scanned, light beams exiting the controllable deflection device. The light beams of a complete scan region or the light beams of a complete image content are thus collimated or merged by means of the collimating element in the direction of the first mirror. The collimating element is in particular a collimating lens or a collimating mirror.

Preferably, according to an example embodiment of the present invention, an eye tracker device is provided for detecting and/or determining the eye state of the user, in particular for detecting and/or determining the eye movement, eye movement speed, pupil position, pupil size, viewing direction, accommodation state, and/or fixation distance of the eye. As a result, improved functionality of the virtual retinal display can advantageously be achieved. Advantageously, a particularly user-friendly virtual retinal display can be achieved, which makes an adjustment of the images that is imperceptible to the user, so that the user can experience as homogeneous an image impression as possible. In particular, the eye tracker device is designed as a component of the virtual retinal display, in particular of the optical system. Detailed configurations of eye trackers are described in the related art so that they are not discussed in more detail at this point. It is possible that the eye tracker device comprises a monocular or a binocular eye tracking system, wherein at least the binocular eye tracking system is in particular configured to derive a fixation distance from opposing eye movements (vergence). Alternatively or additionally, the eye tracker device comprises an eye tracking system having a depth sensor for ascertaining a focal point in the environment for ascertaining the fixation distance. Alternatively or additionally, the eye tracker device and/or the optical system comprises one or more sensors for indirectly, in particular context-dependently, ascertaining a most probable accommodation state of the user eye, such as sensors for ascertaining a head posture, GPS sensors, acceleration sensors, time-of-day meters and/or brightness sensors, or the like. Preferably, the eye tracker device is at least partially integrated into a component of the data glasses, for example in an eyeglass frame of the data glasses.

Preferably, according to an example embodiment of the present invention, the optical system additionally comprises a storage unit in which the imaging path associated with a respective mirror position of the first mirror is stored. Additionally, in this context, the optical system comprises a control unit. The control unit is designed to control the first mirror as a function of the stored imaging paths and of the eye state of the user in such a way that exactly one exit pupil (A, A', B, B') is generated in the region of the pupil of the user, in particular centrally in the region of the pupil of the user. The control unit thus knows to where the image content is projected depending on the respective mirror position. If the control unit now also knows the eye state of the user, the currently used exit pupil can be optimized accordingly.

Additionally, according to an example embodiment of the present invention, it is provided that the optical system comprises a pair of data glasses with an eyeglass frame and eyeglass lenses. The at least one projector unit and the at least one first redirection unit are arranged on the eyeglass frame, and the at least one second redirection unit is arranged in the region of at least one eyeglass lens, in particular integrated into at least one eyeglass lens. As a result, an advantageous configuration of the data glasses and/or an advantageous integration of the virtual retinal display can be achieved. In particular, the data glasses may also comprise more than one projector unit, more than one first redirection unit, more than one second redirection unit, and/or more than one replication component, for example one for each eyeglass lens of the data glasses.

Alternatively, according to an example embodiment of the present invention, it is provided that the image source is arranged, together with the image processing device, in an external device and that the image data, in particular the sub-image data, are transferred from the external device to the projector unit of the data glasses. This can achieve an advantageous configuration of the data glasses, which inter alia has a particularly low weight and/or is particularly inexpensive to produce. In particular, the pair of data glasses comprises a wireless or wired communication device, which is configured at least to receive the image data, in particular the sub-image data, from the external device. The external device is in particular designed as an external device to the data glasses. For example, the external device may be designed as a smartphone, a tablet, a personal computer (e.g., a laptop), or the like.

DETAILED DESCRIPTION OF EXAMPLE EMBODIMENTS

Figure 1A:
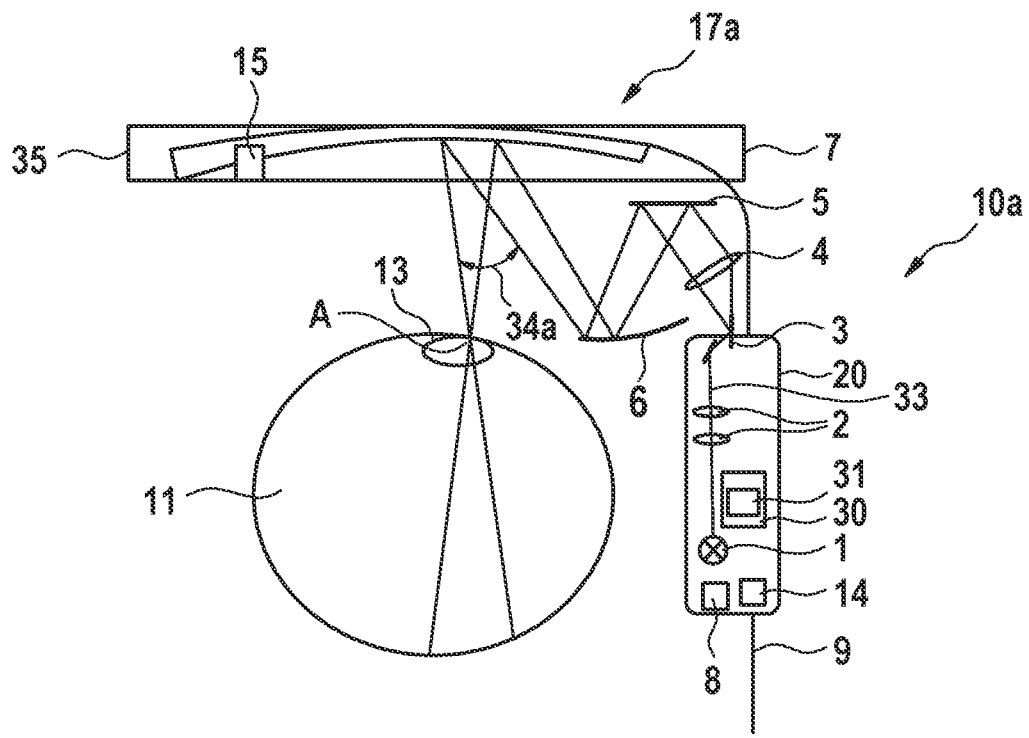
Figure 1A shows a first embodiment of the optical system for a virtual retinal display with a first mirror position, according to the present invention.
Figure 1B:
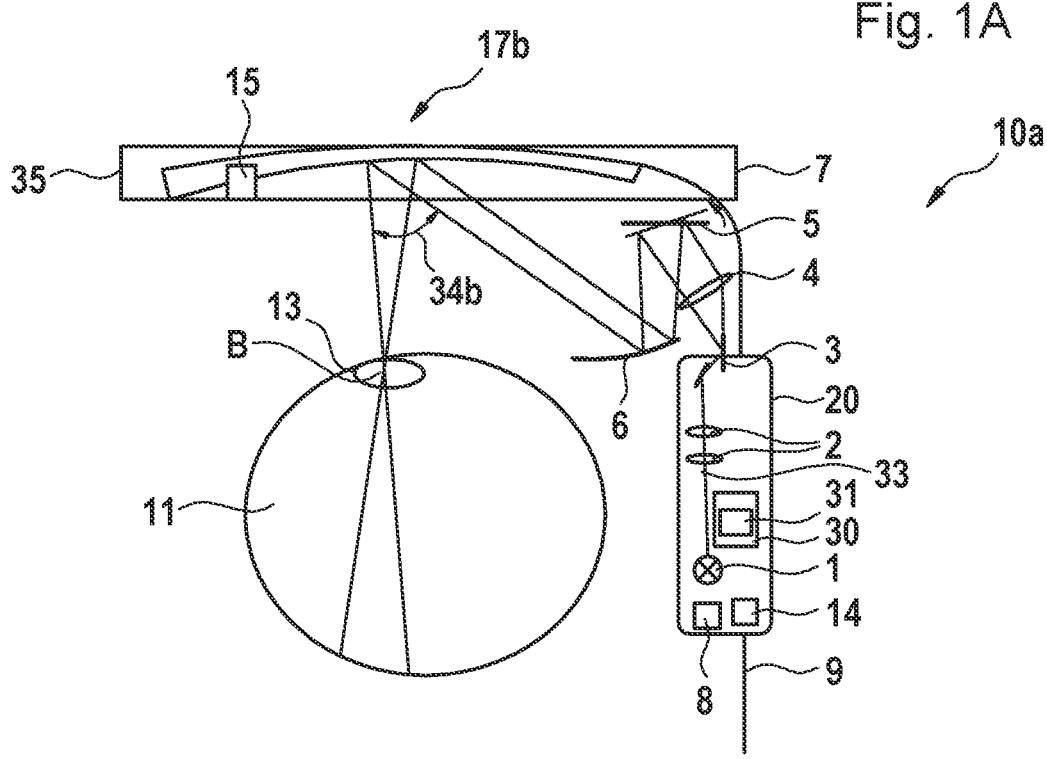
FIG. 1B shows the first embodiment of the optical system with a second mirror position, according to the present invention.

FIG. 1A schematically shows a first embodiment of an optical system 10a for a virtual retinal display (retinal scan display). The optical system 10a comprises an image source 8, which provides image content in the form of image data. Additionally, the optical system 10a comprises an image processing device 14 for the image data. Both the image source 8 and the image processing device 14 are integrated into a projector unit 20 of the optical system 10a in this exemplary embodiment. The projector unit 20 furthermore comprises a time-modulatable light source 1 for generating at least one light beam 33, and a controllable deflection device 3 for the at least one light beam 33 for scanning projection of the image content. The optical system 10a furthermore comprises a first redirection unit comprising a first mirror 5 and a statically, in particular fixedly, mounted optical unit 6. The controllable deflection device 3 is designed to project the image content onto the first mirror 5. The first mirror 5 in turn directs the projected image content onto the statically mounted optical unit 6. The optical system 10a furthermore comprises a second redirection unit 7, which is designed as a holographic optical element in this case. The statically mounted optical unit 6 is designed to direct the projected image content onto the second redirection unit 7, which in turn directs the projected image content onto an eye 11 in the direction of a pupil 13 of a user of the virtual retinal display. The first mirror 5 is in this case designed as a two-dimensionally rotatably mounted mirror, which is in a first mirror position in FIG. 1A. In this first mirror position, the scanned light beam 33 is projected via a first imaging path onto the first projection region 17a of the second redirection unit 7 at a first angle of incidence 34a. In contrast, FIG. 1B shows the first mirror 5 in a second mirror position different from the first mirror position. In this second mirror position, the scanned light beam 33 is projected via a second imaging path onto the second projection region 17b of the second redirection unit 7 at a second angle of incidence 34b. The statically mounted optical unit 6 is designed to direct the projected image content onto the second redirection unit 7 in such a way that the first 17a and the second projection region 17b of the second redirection unit 7 at least partially overlap. Furthermore, FIG. 1A shows how the second redirection unit 7 directs the light beam 33 in the direction of a first exit pupil A of the user when said light beam impinges on the first projection region 17a at the first angle of incident 34a. In contrast, FIG. 1B shows how the second redirection unit 7 directs the light beam in the direction of a second exit pupil B, arranged offset from the first exit pupil, of the user when said light beam impinges on the second projection region 17b at the second angle of incident 34b.

The optical system 10a furthermore comprises an optical replication component (not shown in FIGS. 1A and 1B for simplification purposes) which is arranged fully along or within the second redirection unit 7 and is configured to replicate the projected image content and to direct it at a spatial offset onto the eye 11 of the user so that a plurality of spatially offset exit pupils (A, A', B, B') with the image content is generated.

The image processing device 14 is furthermore designed to provide different sub-image data for the respective imaging path so that distortion of the image content across the respective imaging path is at least partially compensated. In this context, the image processing device 14 is in particular designed to modify, in particular to distort, copy, rotate, shift and/or scale, the image data of the image source 8.

In addition to the mirror positions shown in FIGS. 1A and 1B, the first mirror 5 furthermore has a plurality of further different mirror positions. In this embodiment, the first mirror 5 has a total number of 60 different mirror positions in one dimension. The image content may thus be displaced two-dimensionally to 3600 different positions. Alternatively, it would also be possible for the first mirror to be rotatably mounted in such a way that the different positions of the first mirror are continuously adjustable. Within the two-dimensional rotation of the first mirror 5, there would thus in principle be an endless number of possible mirror positions.

In the first embodiment, the optical unit 6 is designed to focus, in particular bundle, the scanned light beams 33 onto the respective projection region. In this context, the optical unit 6 in the first exemplary embodiment is designed as a concave mirror. The first mirror in turn is designed as a planar mirror in the illustration.

Additionally, the optical system 10a here comprises a collimating lens as collimating element 4, which serves to collimate the plurality of scanned light beams 33 exiting the controllable deflection device 3.

In addition, the optical system 10a comprises an eye tracker device 15 for detecting and/or determining the eye state of the user. In this context, the optical system 10a furthermore comprises a storage unit 31 in which the imaging path associated with a respective mirror position of the first mirror 5 is stored. In this exemplary embodiment, the storage unit 31 is in turn integrated into a control unit 30 of the optical system 10a, which control unit serves to control the first mirror 5 as a function of the stored imaging paths and of the eye state of the user in such a way that exactly one exit pupil (A, A', B, B') is generated in the region of the pupil 13 of the user, in particular centrally in the region of the pupil of the user. The control unit 30 in this embodiment is integrated into the projector unit 20.

In this embodiment, the light source 1 is designed to generate a red, green and blue light beam. In order to bundle this plurality of light beams into a beam bundle, the optical system 10a in this first embodiment furthermore comprises beam shaping optics 2, which are designed as dynamic varifocal eyeglass lenses in this case.

The optical system 10a furthermore comprises a pair of data glasses (shown in part here) with an eyeglass frame 9 and an eyeglass lens 35. The projector unit 20 and the first redirection unit are in this case arranged on the eyeglass frame 9. The second redirection unit 7 is integrated into the eyeglass lens 35.

Figure 2:
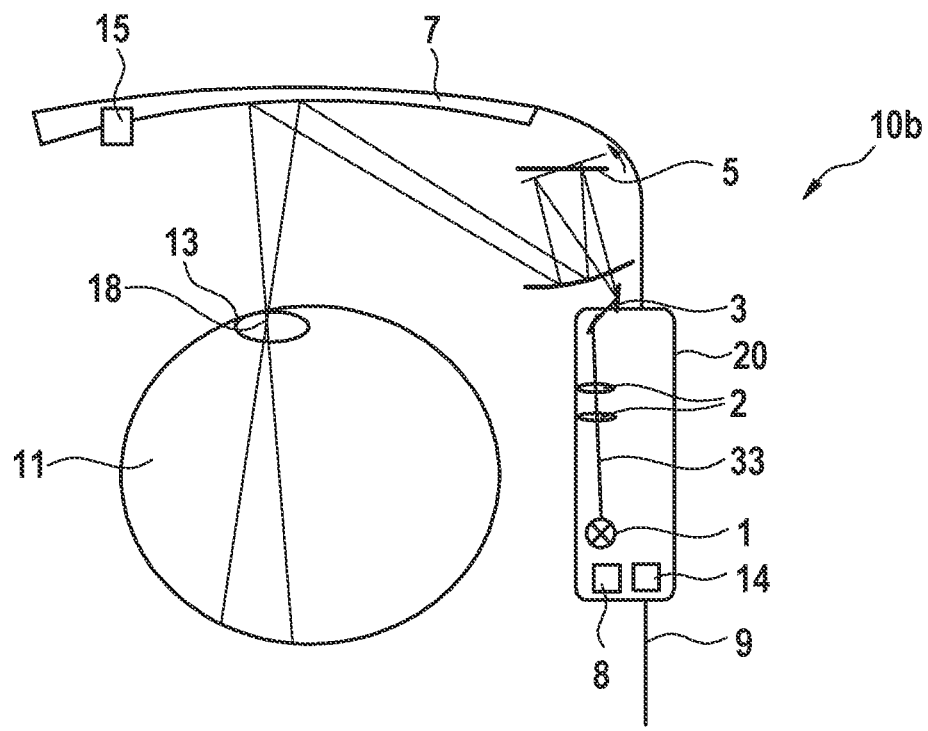
FIG. 2 shows a second embodiment of the optical system, according to the present invention.

FIG. 2 schematically shows a second embodiment of an optical system 10b for a virtual retinal display (retinal scan display). Unlike the above-described embodiment, the optical unit 6 of the first redirection unit at least partially extends into a beam path between the controllable deflection device 3 of the projector unit 20 and the first mirror 5 of the first redirection unit. In order to furthermore enable the scanning light beam 33 to reach the first mirror 5, in particular unimpededly, the optical unit 6 is designed to be at least partially transparent to the at least one light beam 33 in the direction of the controllable deflection device 3.

Figure 3:
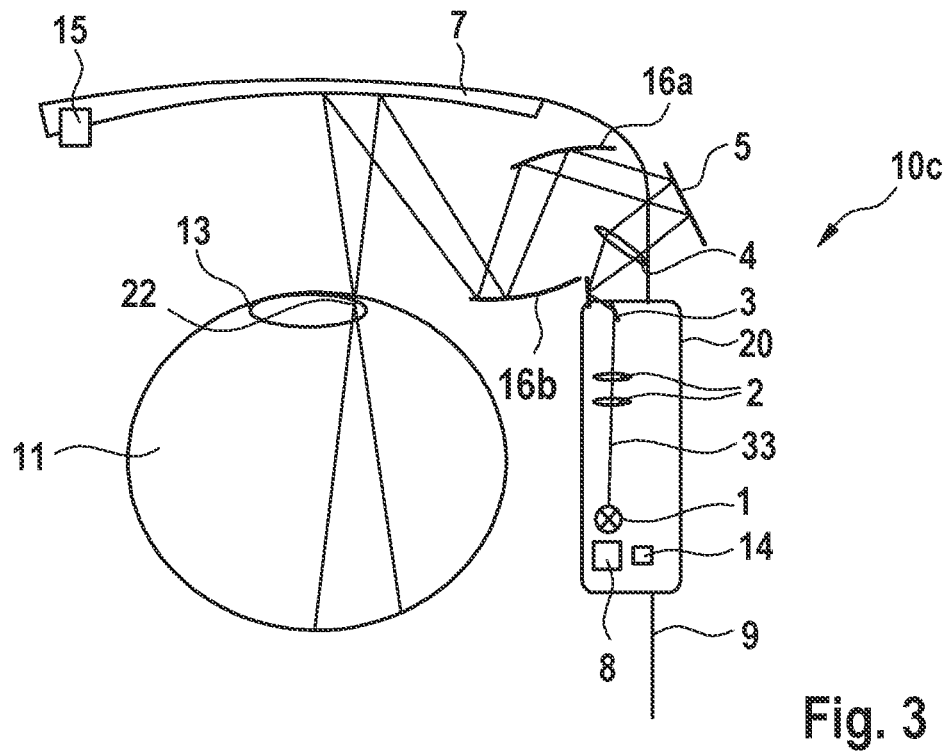
FIG. 3 shows a third embodiment of the optical system, according to the present invention.

FIG. 3 schematically shows a third embodiment of an optical system 10c for a virtual retinal display (retinal scan display). Unlike the above-described embodiments, the first redirection unit of the optical system 10c comprises a first optical unit 16a and a further, second optical unit 16b. In this embodiment, both the first optical unit 16a and the further, second optical unit 16b are designed as a concave mirror. The first optical unit 16a serves to project the projected image content onto the further, second optical unit 16b. The further, second optical unit 16b serves to direct the projected image content onto the second redirection unit 7.

Figure 4:
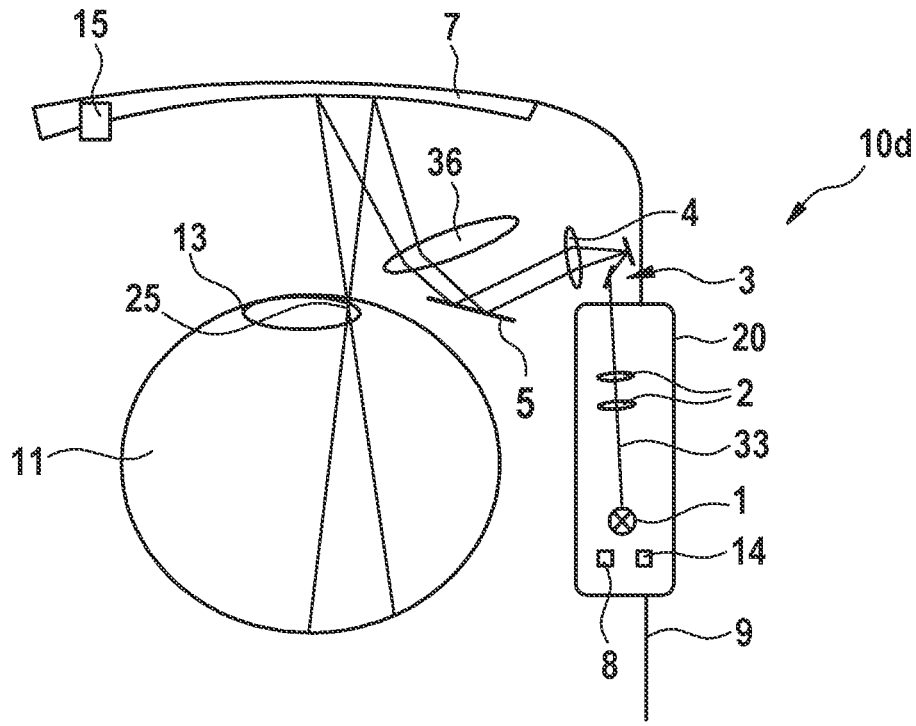
FIG. 4 shows a fourth embodiment of the optical system, according to the present invention.

FIG. 4 schematically shows a fourth embodiment of an optical system 10d for a virtual retinal display (retinal scan display). Unlike the above-described embodiments, the optical unit 36 is in this case designed as a free-form lens, which is also designed here to direct the projected image content onto the second redirection unit 7 in such a way that projection regions of the second redirection unit 7 at least partially overlap.

Figure 5:
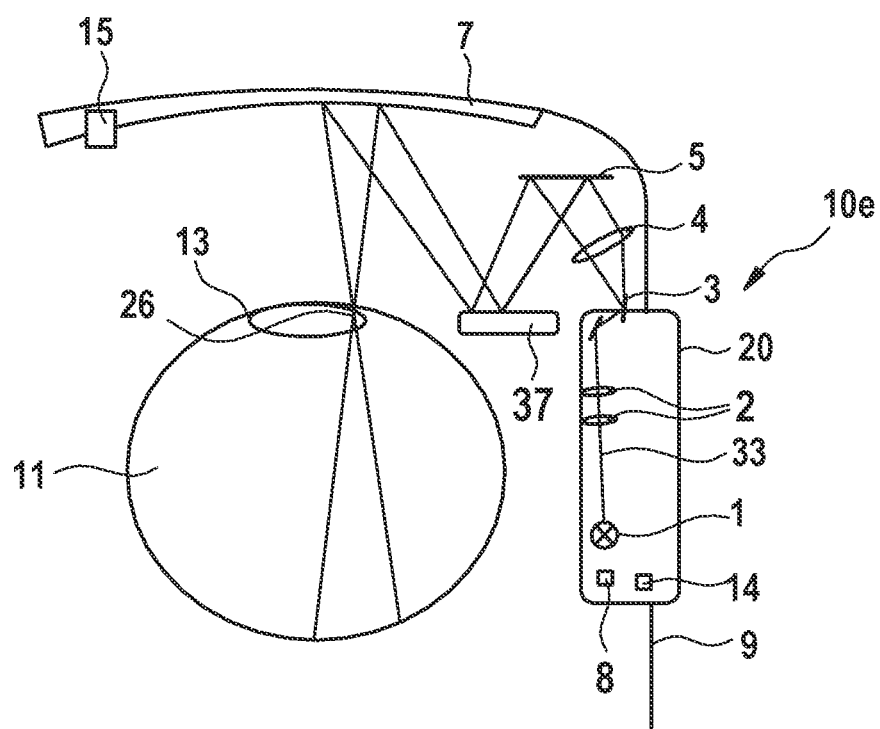
FIG. 5 shows a fifth embodiment of the optical system, according to the present invention.

FIG. 5 schematically shows a fifth embodiment of an optical system 10e for a virtual retinal display (retinal scan display). Unlike the above-described embodiments, the optical unit 37 is in this case designed as a phase modulator, in particular as an SLM or an LCoS.

What is claimed is:

1. An optical system for a virtual retinal scan display, comprising:
    an image source configured to provide image content in the form of image data;
    an image processing device for the image data;
    a projector unit including a light source configured to generate at least one light beam, and a controllable deflection device for the at least one light beam for scanning projection of the image content;
    a first redirection unit including a first mirror, and at least one statically, fixedly, mounted optical unit, wherein the controllable deflection device is configured to project the image content onto the first mirror, and the first mirror is configured to direct the projected image content onto the statically mounted optical unit; and
    a second redirection unit, wherein the statically mounted optical unit is configured to direct the projected image content onto the second redirection unit, and the second redirection unit is configured to direct the projected image content onto an eye of a user of the virtual retinal display;
    wherein the first mirror is a mirror that is at least one-dimensionally rotatably mounted, so that the light beam impinges via a first imaging path on at least a first projection region of the second redirection unit at a first angle of incidence when the first mirror is in a first mirror position, and the light beam impinges via a second imaging path on at least a second projection region of the second redirection unit at a second angle of incidence when the first mirror is in a second mirror position; and
    wherein the statically mounted optical unit is configured to direct the projected image content onto the second redirection unit in such a way that the first and the second projection region of the second redirection unit at least partially overlap.

2. The optical system according to claim 1, wherein the first mirror is a two-dimensionally rotatably mounted mirror.

3. The optical system according to claim 1, wherein the second redirection unit is configured to direct the light beam in a direction of a first exit pupil of the user when the light beam impinges on the first projection region at the first angle of incidence and to direct said light beam in a direction of a second exit pupil, arranged offset from the first exit pupil, of the user when the light beam impinges on the second projection region at the second angle of incidence.

4. The optical system according to claim 1, further comprising:
    an optical replication component arranged at least in the first and the second projection region of the second redirection unit and configured to direct the projected image content, replicated and spatially offset, onto the eye of the user so that a plurality of spatially offset exit pupils with the image content is generated.

5. The optical system according to claim 1, wherein the image processing device is configured to provide different sub-image data for respective imaging paths so that distortion of the image content across the respective imaging paths is at least partially compensated.

6. The optical system according to claim 1, wherein the first mirror is rotatably mounted in such a way that the first and second mirror positions of the first mirror are continuously adjustable.

7. The optical system according to claim 1, wherein the first mirror is rotatably mounted in such a way that the first mirror has a number of 25 to 1024 different mirror positions in one dimension.

8. The optical system according to claim 7, wherein the number is 5 to 60.

9. The optical system according to claim 1, wherein the optical unit is configured to bundle a plurality of scanned light beams onto the first and second projection regions.

10. The optical system according to claim 1, wherein the optical unit includes at least one concave mirror or convex mirror or holographical optical element, or a collecting lens or an SLM.

11. The optical system according to claim 1, wherein the optical unit of the first redirection unit at least partially extends into a beam path between the controllable deflection device of the projector unit and the first mirror of the first redirection unit, wherein the optical unit is configured to be at least partially transparent to the at least one light beam in a direction of the controllable deflection device.

12. The optical system according to claim 1, wherein the first mirror is a planar mirror or a curved mirror or a concave mirror or a convex mirror or a first holographic optical element.

13. The optical system according to claim 1, further comprising:
- a collimating element including a collimating lens or a collimating mirror, configured to collimate a plurality of scanned light beams exiting the controllable deflection device.

14. The optical system according to claim 1, further comprising:
- an eye tracker device configured to detect and/or determine an eye state of the user including to detect and/or determine the eye movement and/or eye movement speed and/or pupil position and/or pupil size and/or viewing direction and/or accommodation state and/or fixation distance, of the eye.

15. The optical system according to claim 1, further comprising:
- a storage unit in which an image path associated with each respective mirror position of the first mirror is stored; and
- a control unit configured to control the first mirror as a function of the stored imaging paths and an eye state of the user in such a way that exactly one exit pupil in a centrally-located region of a pupil of the user, is generated.

16. The optical system according to claim 1, further comprising:
- a pair of data glasses with an eyeglass frame and eyeglass lenses;
- wherein the at least one projector unit and the at least one first redirection unit are arranged on the eyeglass frame, and the at least one second redirection unit is integrated into at least one eyeglass lens.

* * * * *